June 5, 1934.  A. SONNEFELD  1,961,601
BIPRISM FOR SPECTROSCOPES
Filed April 25, 1933
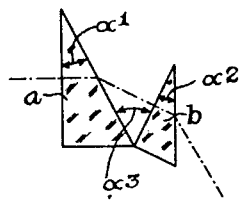
Inventor:
August Sonnefeld.

UNITED STATES PATENT OFFICE 1,961,601

BIPRISM FOR SPECTROSCOPES

August Sonnefeld, Jena, Germany, assignor to firm Carl Zeiss, Jena, Germany

Application April 25, 1933, Serial No. 667,857
In Germany April 30, 1932

1 Claim. (Cl. 88—1)

The present invention consists in so positioning the two members of a bi-prism for spectroscopes relatively to each other as to increase the dispersion to an extent unknown so far and to abide with the ordinary total deviation of the said members, this increase being attained by providing that the sine of the angle at which the front surface of the second member is inclined relatively to the rear surface of the first member is equal to approximately the sine of the angle at which the two refracting surfaces of the first member are inclined relatively to each other, multiplied by the refractive index of the first member. As a consequence, when a pencil of rays enters the first member at right angles, the pencil of the wave-length to which the refractive index of the first member refers enters also the second member approximately at right angles.

Hitherto, the two members of a bi-prism have been disposed symmetrically to a plane bisecting the angle they embrace, and this in such a manner that they assume the position of minimum deviation or that the pencil of incident rays enters the first prism surface at right angles. These known arrangements do however not permit to provide such an increase of the dispersion as is obtained with that according to the invention.

For a full understanding of the invention, reference is to be had to the following description and the accompanying drawing, which represents a view of an example of a bi-prism according to the invention.

The bi-prism represented in the drawing consists of two members $a$ and $b$ of a heavy flint glass which is designated SF6 in the catalogue of the Jenaer Glaswerk Schott & Gen. The refractive index of this glass for the G-line is $n_1=1.847$. The magnitudes of the refracting angles of the members $a$ and $b$, which are designated $\alpha_1$ and $\alpha_2$, respectively, are 27° each. The angle embraced by the front surface of the second member and the rear surface of the first member is designated $\alpha_3$. According to the invention, the two members are so positioned relatively to each other that $$\sin \alpha_3 = n_1 \sin \alpha_1 = 0.8385 \text{ or } \alpha_3 = 57°.$$

When a light ray strikes the first refracting surface of the member $a$ at right angles, the rays of the wave-length corresponding to the G-line of the solar spectrum are refracted according to what is indicated by dash-lines in the drawing, the dispersion being 4° 56'. Not only is this dispersion greater than that attained with the unwieldy single prism of the same glass, but it considerably surpasses that of the known bi-prisms. This favourable result is increased to the best advantage by the fact that the loss at the ray entrance surfaces is largely reduced, and that the second member is comparatively small. As a consequence, absorption losses are insignificant, and the cost of the prism is low.

I claim:

Bi-prism for spectroscopes, consisting of two members whose refracting edges are at one and the same side, the sine of the angle at which the front surface of the second member and the rear surface of the first member are inclined relatively to each other being equal to approximately the sine of the angle at which the two refracting surfaces of the first prism are inclined relatively to each other, multiplied by the refractive index of the first member.

AUGUST SONNEFELD.